US012628250B2

(12) United States Patent
Dobrescu et al.

(10) Patent No.: US 12,628,250 B2
(45) Date of Patent: May 12, 2026

(54) ILLUMINATED BODY FOR A LAMP OF A VEHICLE, LAMP OF A VEHICLE AND METHOD FOR SETTING AN ELECTRIC CURRENT OF A LIGHT SOURCE OF AN ILLUMINATED BODY

(71) Applicant: Hella GmbH & Co. KGaA, Lippstadt (DE)

(72) Inventors: Martin Dobrescu, Herne (DE); Christian Schlump, Lippstadt (DE); Patrick Vogel, Unna (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 234 days.

(21) Appl. No.: 18/466,417

(22) Filed: Sep. 13, 2023

(65) Prior Publication Data

US 2024/0032163 A1 Jan. 25, 2024

Related U.S. Application Data

(63) Continuation of application No. PCT/EP2022/055620, filed on Mar. 4, 2022.

(30) Foreign Application Priority Data

Mar. 16, 2021 (DE) ..................... 10 2021 106 327.2
May 20, 2021 (DE) ..................... 10 2021 113 177.4

(51) Int. Cl.
*H05B 45/18* (2020.01)
*H05B 45/56* (2020.01)
(Continued)

(52) U.S. Cl.
CPC ............. *H05B 45/18* (2020.01); *H05B 45/56* (2020.01); *F21S 41/141* (2018.01); *F21S 43/14* (2018.01)

(58) Field of Classification Search
CPC ...... H05B 47/17; H05B 47/105; H05B 45/56; H05B 45/30; H05B 45/28; H05B 45/18;
(Continued)

(56) References Cited

U.S. PATENT DOCUMENTS

2011/0241572 A1* 10/2011 Zhang .................... H05B 45/18 315/308
2019/0394850 A1 12/2019 Delgrange et al.
2022/0353966 A1* 11/2022 Ichikawa ................ F21S 45/47

FOREIGN PATENT DOCUMENTS

DE 102010006998 A1 8/2011
EP 3389340 A1 10/2018
WO 2020002264 A1 1/2020

* cited by examiner

*Primary Examiner* — Renan Luque
(74) *Attorney, Agent, or Firm* — Husch Blackwell LLP

(57) ABSTRACT

An illuminated body is provided for a lamp of a vehicle, and includes at least one carrier body, at least one light source arranged on the carrier body, at least one sensor unit for detecting a temperature, and at least one control unit for setting an electric current of the light source for emitting the light of the light source as a function of the temperature detected by the sensor unit. The control unit is at least designed to set for a first temperature range (B1) the electric current of the light source as a function of the temperature detected by the sensor unit on the basis of a first control section (A1) of a control curve (C1) and for a second temperature range (B2) on the basis of a second control section (A2) of the control curve (C1).

18 Claims, 4 Drawing Sheets

(51) Int. Cl.
*F21S 41/141* (2018.01)
*F21S 43/14* (2018.01)

(58) Field of Classification Search
CPC .......... H05B 45/10; G01K 7/021; B60Q 1/20; B60Q 1/04; B60Q 1/0088
See application file for complete search history.

ILLUMINATED BODY FOR A LAMP OF A VEHICLE, LAMP OF A VEHICLE AND METHOD FOR SETTING AN ELECTRIC CURRENT OF A LIGHT SOURCE OF AN ILLUMINATED BODY

CROSS REFERENCE

This application claims priority to PCT Application No. PCT/EP2022/055620, filed Mar. 4, 2022, which itself claims priority to German Application No. 10 2021 106327.2, filed Mar. 16, 2021 and to German Application No. 10 2021 113177.4, filed May 20, 2021, the entireties of both of which are hereby incorporated by reference.

FIELD OF THE INVENTION

The present invention relates to an illuminated body for a lamp of a vehicle, a lamp of a vehicle and a method for setting an electric current of a light source of an illuminated body.

BACKGROUND OF THE INVENTION

Nowadays, lamps of a vehicle, such as a headlamp or a rear lamp, fulfill several functions. The rear lamp can, for example, comprise a reverse lamp and/or a direction indicator light and/or a stop light and/or a tail light and/or a rear fog light and/or a reflex reflector. Alongside halogen lamps, xenon lamps and increasingly lamps with light-emitting diodes (LEDs) for emitting light are available on the market.

For the lamps, a notable role is played not only by legal aspects of the lamp, for example light values according to statutory regulations (ECE, CCC, SAE) to be complied with but also technical aspects, for example the lifetime of the lamp. A luminous flux emitted by a light-emitting diode as a light source can depend on a temperature of the light-emitting diode, wherein the temperature of the light-emitting diode itself can depend on external influences, such as an ambient temperature. Furthermore, the luminous flux emitted by the light-emitting diode can depend on the electric current of the light source for emitting the light. Alongside the luminous flux, the lifetime of the light-emitting diode can also depend on the temperature of the light-emitting diode. Current lamps at least comply with these two aspects, in particular a compromise between these two aspects, only in a suboptimal manner.

BRIEF SUMMARY OF THE INVENTION

The purpose of this invention is to remedy at least some of the aforementioned disadvantages. In particular, it is the task of the present in particular to generate or set in a particularly simple and/or cost-effective manner a luminous flux of a light source of an illuminated body or of a lamp across a specifiable temperature range, in particular across an operating temperature range, of the illuminated body or of the lamp in a particularly advantageous manner. Furthermore, it is in particular the task of the invention to generate or set a luminous flux of at least one light source of an illuminated body or of a lamp across at least one specifiable temperature range, in particular across an operating temperature range, of the illuminated body or the lamp in such a way that the luminous flux complies with specifiable values and/or technical threshold values of the illuminated body or the lamp, such as a specifiable lifetime and/or a maximum temperature of the illuminated body or the lamp, in particular of a light source, are complied with.

The aforementioned task is solved by an illuminated body and a lamp, as well as by a method as described herein. The features and details described in the context of the inventive illuminated body also apply in the context of the inventive lamp and/or the inventive method, and vice versa in each case, so that any disclosed information regarding individual aspects of the invention refer to and/or can refer to either.

According to a first aspect, the present invention depicts an illuminated body for a lamp of a vehicle, in particular for a lamp of a motor vehicle, wherein the illuminated body features at least a carrier body and at least one light source arranged on the carrier body for emitting light, and at least one sensor unit for detecting a temperature of the illuminated body. Furthermore, the illuminated body comprises at least one control unit for setting an electric current of the light source for emitting the light of the light source as a function of the temperature detected by the sensor unit, wherein the control unit at least designed to set for a first temperature range the electric current of the light source as a function of the temperature detected by the sensor unit on the basis of a first control section of a control curve and wherein the control unit is designed to set for a second temperature range differing from the first temperature range the electric current of the light source as a function of the temperature detected by the sensor unit on the basis of a second section of the control curve differing from the first control section.

The motor vehicle is in particular an automobile.

In particular, the illuminated body can be understood to be a reflector. In particular, the reflector is designed in such a way that it catches the light or the luminous flux emitted by the light source and directs it in a definable direction, for example in the direction of a traffic lane.

The carrier body can feature an upper side for arranging at least an electronic component of the illuminated body. In particular, the at least one light source and/or the at least one sensor unit and/or the at least one control unit each constitute an electronic component. In addition, the carrier body can be designed to be plate-shaped. With a plate-shaped carrier body, the illuminated body or the lamp can be particularly simply designed. One side of the plate of the plate-shaped can form the upper side for arranging an electronic component. The carrier body is in particular a wiring board. The wiring board can also be understood to be a printed circuit board (PCB). Furthermore, the carrier body can be made of several parts. The carrier body made of several parts can feature several partial carrier bodies, for example several printed circuit boards, wherein, in particular, electronic component parts of the illuminated body are arranged on each of the several partial carrier bodies. Furthermore, the partial carrier bodies can be fashioned to be separate from each other.

The light emitted by the light source can be understood to be a luminous flux of the light source. The light source can feature at least, in particular be, one light-emitting diode (LED). A light-emitting diode can, for example, be an organic light-emitting diode (OLED) or an inorganic light-emitting diode. With a light-emitting diode, it is possible to set a luminous flux of the illuminated body or of the lamp in a particularly simple manner. When the LED reaches temperatures that are too high, the LED can be damaged or destroyed. In particular, the at least one light source is arranged on an upper side of the carrier body. This means that the illuminated body or the lamp can be particularly simply designed. In particular, the at least one light source is a plurality of light sources, wherein in particular the control unit sets in each case for at least part of the plurality of light sources the electric current of the respective light source as a function of the temperature detected by the sensor unit, preferentially immediately or essentially immediately. Preferentially, the plurality of light sources are light sources of the same kind, for example light-emitting diodes. The plurality of light sources can be a plurality of light-emitting diodes. Furthermore, the plurality of light sources can form at least a light group, preferentially several light groups. In particular, at least one first part of the plurality of light sources can form a first light group and a further part of the plurality of light sources a further light group. Furthermore, it is in particular conceivable that the control unit is designed to set for the first light group for several differing temperature ranges the electric current of the first light group on the basis of several differing control sections of a first control curve, and wherein the control unit is additionally designed to set for the further light group for several differing temperature ranges the electric current of the further light group on the basis of several differing control sections of a second control curve differing from the first control curve. In this context, the temperature ranges and/or the control sections of the first light group can differ from the temperature ranges and/or the control sections of the further light group. In particular, one light group features a plurality of light sources with the same light color or essentially the same light color, such as “red” or “yellow”. In particular, at least one light function of the lamp is allocated to a light group or forms a light function. The illuminated body or the lamp can comprise, for example as a light function, braking (stop light) and/or as a further light function indicating direction (direction indicator light), etc.

The at least one sensor unit for detecting a temperature of the illuminated body features in particular a temperature sensor. It is in particular also conceivable that the sensor unit is a temperature sensor. The illuminated body or the lamp can thus have a particularly simple and cost-effective design and furthermore a luminous flux of a light source of an illuminated body or a lamp can be set across a temperature range in a particularly simple manner. The temperature sensor comprises in particular a thermistor for example a PTC thermistor or an NTC thermistor. This means that detection of the temperature of the illuminated body can be performed in a particularly cost-effective manner. The sensor unit can also feature several temperature sensor for detecting a temperature of the illuminated body, for example a temperature of a first light group through a first temperature sensor and a temperature of a further light group through a further temperature sensor, wherein in particular the a temperature substitute value, preferentially an average temperature of the illuminated body determined from the respective detected temperatures as the temperature detected by the sensor unit. The NTC thermistor can transmit a voltage value, which corresponds to a temperature value, independently of the temperature. Furthermore, the sensor unit, in particular the temperature sensor, can be connected quite preferentially to the NTC thermistor, in particular a driver as control unit for communication technology purposes. For example, the NTC thermistor can be connected directly to an LED channel of the LED driver for transmitting the voltage values, which correspond to temperature values.

Detecting the temperature of the illuminated body is performed in particular during operation of the illuminated body or during operation of the lamp, wherein preferentially during operation of the illuminated body or during operation of the lamp that the at least light source emits light. In particular, when detecting and/or for detecting the temperature of the illuminated body by the sensor unit, the temperature of the light source and/or of the carrier body and/or the environment can be detected. The setting of a luminous flux of the light source of an illuminated body or the lamp can thus be performed particularly precisely across a temperature range. Furthermore, detection of the temperature of the illuminated body by means of the sensor unit in particular a direct detection of the temperature, in particular of the surface temperature, of the illuminated body. When directly detecting the temperature of the illuminated body, the sensor unit, in particular a temperature sensor of the sensor unit contacts at least partially the illuminated body, for example the carrier body and/or the light source of the illuminated body, directly. When detecting the temperature of the carrier body, the temperature of the light source and/or the environment can also be deduced through the temperature of the carrier body. In particular, it is also conceivable that detection of the temperature of the illuminated body through the sensor unit is an indirect detection of the temperature of the illuminated body. When indirectly detecting the temperature of the illuminated body, the sensor unit, in particular a temperature sensor of the sensor unit, does not directly contact the illuminated body, for example the carrier body and/or the light source of the illuminated body. For example, the sensor unit, in particular a temperature sensor of the sensor unit, can be arranged at a distance to carrier body and the light source of the illuminated body for indirectly detecting the temperature, in particular the ambient temperature of the illuminated body. Through the detected temperature, it is in particular possible to also deduce the temperature of the light source and/or the carrier body. This means that the carrier body can be designed in a particularly simple and compact manner. In particular, indirect detection of the temperature of the illuminated body can be performed contact-free, for example by detecting electromagnetic radiation such as an infrared radiation. Detection of the electromagnetic radiation, such as infrared radiation for detecting the temperature of the illuminated body can be performed for example by means of an infrared sensor.

The control unit can also be understood to be a driver electronics unit. Furthermore, the control unit can also comprise several sub-control units. The sub-control units can in particular communicate bidirectionally with each other. In particular, one sub-control unit can be designed like a control unit, preferentially a sub-control unit can preferentially be understood as a control unit. The control unit can feature a memory and/or a calculator unit and/or a logical unit. At least the control curve with the first control section and/or the second control section and/or the third control section can be saved in the memory. In particular, the control unit can be preferentially a driver, preferentially an LED driver with LED channels. The driver can feature a microcontroller. The LED driver is, in particular, freely programmable, wherein various parameters, such as a maximum current (peak current) and/or a nominal current factor (nominal derating multiplier) and/or a minimum current factor (minimum derating multiplier) and/or several temperature-electric current (value) pairs, in particular what are known as supporting points, can be adjusted or programmed. A (LED) rated current of an LED, in particular the maximum current is multiplied with the nominal derating multiplier. A (LED) minimum current is in particular a product of maximum current, nominal current factor and minimum current factor. In particular, the current values are linearly interpolated by the LED driver between the supporting points. Preferentially, no regulation is performed (multiplier at 100%) initially, i.e. before a temperature, in particular a temperature of the illuminated body, is known.

Furthermore, setting the electric current of the light source for emitting the light from the light source, in particular setting the amperage of the electric current of the light source for emitting the light from the light source. The light source can emit light through the flow of the current "through" the light source. Furthermore, the control unit can be arranged on the carrier body. It is also conceivable that the control unit is not arranged on the carrier body, in particular not on the carrier body of the at least one light source to be set. The control unit not arranged on the carrier body can be, for example a vehicle control unit, such as a control unit of a vehicle, or a control unit or sub-control unit arranged on a sub-carrier body of the carrier body. In particular, setting of the electric current of the light source for emitting from the light source can be performed advantageously in a cost-effective manner with a vehicle control unit already present in the vehicle. The vehicle control unit can also be understood to be an electronic circuit unit (ECU). This means that the carrier body with the at least one light source arranged on the carrier body can be of a particularly simple and compact design. Furthermore, this means that a luminous flux of the light source of the illuminated body or the lamp comply across at least one temperature range (light) with values that are particularly easily specifiable and/or the light source features a particularly long lifetime, as the control unit as a heat source on the carrier body is no longer necessary. Furthermore, the control unit can be a control unit for setting the electric current for the at least one light source, in particular for setting the electric current for several light sources, preferentially for setting the electric current for at least one light group, quite preferentially for setting a respective electric current for several light groups.

The electric current of the light source or the amperage of the light source for emitting the light from the light source is in particular an electric current supplied to the light source, wherein the light source emits, due to the electric current, light, in particular light with a specific luminous flux.

In particular, the illuminated body for the lamp or the lamp features a specifiable temperature range, wherein in particular across the specifiable temperature range the illuminated body or the lamp is to comply with the light values according to statutory or legal regulations and/or technical threshold values. In particular, the specifiable temperature range features at least the first temperature range and the second temperature range. Preferentially, the first temperature range and the second temperature range form an operating temperature range. It is also conceivable that the specifiable temperature range features more than two temperature ranges, in particular three temperature ranges, or is formed by more than two temperature ranges, in particular three temperature ranges. The several temperature ranges can differ in size. This means setting the electric current of the light source for emitting the light across at least one specifiable temperature range can be performed in a particularly advantageous manner. Furthermore, the at least two temperature ranges, in particular the more than two temperature ranges, for example the three temperature ranges, preferentially a coherent temperature range, in particular a coherent operating temperature range. For example, the first temperature range can comprise temperatures from −40 to 0° C., the second temperature can comprise range temperatures from 0 to +65° C. and the third temperature range can comprise temperatures from +65 to 80° C. to form a coherent temperature range. In particular, the individual temperature ranges do not overlap each other. It is, of course, also conceivable that the at least one control unit is designed to set for more than three temperature ranges the electric current of the light source as a function of the temperature detected by the sensor unit on the basis of a respective control section of the control curve, wherein in particular at least two of the several control sections differ, wherein preferentially at least three of the several control sections differ from each other in each case or feature differing control behavior.

In particular, the first control section of the control curve is a continuous control section and/or the second control section is a continuous control section of the control curve and/or the third control section is a continuous control section of the control curve. In this way, it is possible to avoid an abrupt leap in the luminous flux of the at least one light source within a respective control section.

Furthermore, the control curve can be a continuous control curve. In this way, it is possible to avoid an abrupt leap in the luminous flux of the at least one light source at transitions in the temperature ranges. In particular, at least the first control section of the control curve and the second control section of the control curve give rise to or form the continuous control curve. In other words, at least the first control section of the control curve and the second control section of the control curve give rise to in particular a "coherent line". Preferentially, at least the first control section and the second control section and a third control section give rise to or form a continuous control curve. It is conceivable that the control curve features in particular at least one kink point. In particular, the continuous control curve can feature a kink point at a temperature transition from the first temperature range to the second temperature range. Furthermore, the control curve can feature a kink point at a temperature transition from the second temperature range to the third temperature range.

Furthermore, the first control section of the control curve can be a continuously differentiable control section and/or the second control section a continuously differentiable control section of the control curve and/or the third control section continuously differentiable control section of the control curve. This means that it is possible to advantageously achieve a particularly even transition of the luminous flux of the at least one light source.

Furthermore, the control curve can be a continuously differentiable control curve. In particular, the first control section of the control curve and the second control section of the control curve give rise to or form a continuously differentiable control curve. Preferentially, the first control section and the second control section and a third control section give rise to or form a continuously differentiable curve. As an advantage, the inventive illuminated body or an inventive lamp or an inventive method can be used to set for a first temperature range the electric current of the light source as a function of the temperature detected by the sensor unit on the basis of a first control section of a control curve and to set for a second temperature range differing from the first temperature range the electric current of the light source as a function of the temperature detected by the sensor unit on the basis of a second section of the control curve differing from the first control section. By setting the electric current of the light source in such a way makes it possible to generate and/or set in a particularly simple and/or cost-effective manner a luminous flux from a light source of an illuminated body or a lamp at least across the first temperature range and the second temperature range of the illuminated body or the lamp in a particularly advantageous, in particular simple manner. This means in particular, the luminous flux of the light source of an illuminated body or a lamp can be generated and/or set and/or stabilized across at least the first temperature range and the second temperature range in such way that the luminous flux can comply with specifiable values, for example legally specified light values, and at the same time technical threshold values, such as a maximum temperature of the illuminated body or the lamp.

As an advantage with an inventive illuminated body, the first control section of the control curve can feature a first control behavior for setting an electric current of the light source and the second control section of the control curve a second control behavior differing from the first control behavior. In particular, the first control behavior is deigned in such a way that at least in certain ranges in the first temperature range in the event of a detected temperature increase of the illuminated body the electric current of the light source for emitting the light is increased and/or in the event of a detected temperature decrease of the illuminated body the electric current of the light source for emitting light is reduced. In particular, it is furthermore also conceivable that the first control behavior is additionally designed such that at least in certain ranges in the first temperature range in the event of a detected temperature increase of the illuminated body the electric current of the light source for emitting the light is kept constant or essentially constant and/or in the event of a detected temperature decrease of the illuminated body the electric current of the light source for emitting the light is kept constant or essentially constant. This means that the first control section of the control curve can advantageously demonstrate in the event of a detected temperature increase a monotonously increasing control behavior, preferentially a strictly monotonously increasing control behavior and/or in the event of a detected temperature decrease a monotonously decreasing control behavior, preferentially a strictly monotonously decreasing control behavior. In particular, the second control behavior is deigned in such a way that at least in certain ranges in the second temperature range in the event of a detected temperature decrease of the illuminated body the electric current of the light source for emitting the light is decreased and/or in the event of a detected temperature decrease of the illuminated body the electric current of the light source for emitting light is increased. In particular, it is furthermore also conceivable that the second control behavior is additionally designed such that at least in certain ranges in the second temperature range in the event of a detected temperature increase of the illuminated body the electric current of the light source for emitting the light is kept constant or essentially constant and/or in the event of a detected temperature decrease of the illuminated body the electric current of the light source for emitting the light is kept constant or essentially constant. This means that the second control section of the control curve can advantageously demonstrate in the event of a detected temperature increase a monotonously decreasing control behavior, preferentially a strictly monotonously decreasing control behavior and/or in the event of a detected temperature increase a monotonously increasing control behavior, preferentially a strictly monotonously increasing control behavior.

It can be advantageous with an inventive illuminated body for the control curve to represent an allocation regulation in order to allocate to the temperature detected by the sensor unit an electric current for setting the electric current of the light source for emitting the light from the light source. With the allocation regulation, the control unit can unambiguously allocate an electric current (amperage) to a temperature detected by the sensor unit, which electric current is supplied to the light source, such that the light source emits light or light with a specific luminous flux. The allocation regulation can also be understood as a function. In particular, the allocation regulation and/or further allocation regulations can at least partially be stored on a memory of the control unit. Preferentially, at least two (allocation) values of an allocation regulation are stored in each case in a memory of the control unit, wherein in particular the values between the two of the values stored on the memory are interpolated by the control unit. The at least two (allocation) values of an allocation regulation can in particular delimit and define a temperature range. In particular, a plurality or a multitude of (allocation) values of an allocation regulation, for example of a first allocation regulation can also be stored in a memory of the control unit, such that setting the electric current of the light source can be performed particularly quickly. The control unit can determine or calculate the electric current to be set as a function of the temperature detected by (received from) the sensor unit by means of interpolation and set a corresponding electric current, i.e. the amperage. A temperature-electric current (value) pair can be understood as a value of an allocation regulation. The temperature-electric current (value) pair is in particular predefined and programmable. A temperature-electric current pair is in particular a supporting point, which can, for example, be stored in an LED driver. Interpolation is preferentially a linear interpolation. This means setting the electric current of the light source for emitting the light can be performed in a particularly simple manner.

As an advantage with an inventive illuminated body, the control unit can be designed, at least in certain ranges in the second temperature range in the event of a detected change in the temperature of the illuminated body, to change the electric current of the light source for emitting the light on the basis of the first control section of the control curve, in particular in the event of a detected temperature increase of the illuminated body, to increase the electric current of the light source for emitting the light on the basis of the first control section of the control curve and/or, in the event of a detected temperature decrease of the illuminated body, to decrease the electric current of the light source for emitting the light on the basis of the first control section of the control curve. In particular, the first temperature range is a low temperature range and the second temperature range a medium temperature range, wherein the temperatures of the low temperature range are lower than the temperatures of the medium temperature range. As an advantage, in the low temperature range in the event of a detected temperature change in the low temperature range, it is possible to prevent the light value being exceeded by changing, for example in the event of a detected temperature decrease by decreasing the electric current of the light source for emitting the light. In particular, the control curve represents in the first control section at least in certain ranges in the low temperature range a monotonously increasing, preferentially a strictly monotonously increasing allocation regulation. Preferentially, the control curve represents in the first control section at least in certain ranges in the low temperature range a linear allocation regulation or a linear function of the temperature across the electric current or the amperage with a positive increase. Preferentially, the control curve represents in the first control section across the entire low temperature range a linear function of the temperature across the electric current or the amperage with a positive increase. This means that the first control section or the control curve can be particularly simply designed.

As a particular advantage with an inventive illuminated body, the control unit can be designed to keep, at least in certain ranges in the second temperature range, in the event of a detected change in the temperature of the illuminated body the electric current of the light source for emitting the light on the basis of the second control section of the control curve constant or essentially constant. In particular, the second temperature range is a medium temperature range wherein the temperatures of the medium temperature range are higher than the temperatures of the low temperature range, and wherein in particular the temperatures of the medium temperature range are additionally lower than the temperatures of a high temperature range. As an advantage, in the medium temperature range in the event of a detected temperature change in the medium temperature range, the electric current of the light source for emitting the light on the basis of the second control section of the control curve is kept constant or essentially constant, such that the generation or setting of the luminous flux of the light source is kept particularly simple. In particular, the control curve represents in the second control section at least in certain ranges in the medium temperature range a linear function of the temperature across the electric current or the amperage with a zero increase. Preferentially, the control curve represents in the second control curve across the entire medium temperature range a linear allocation regulation or linear function of the temperature across the electric current or the amperage with a zero increase. This means that the second control section or the control curve can be particularly simply designed.

In accordance with a further preferred embodiment, with an inventive illuminated body, the control unit can be designed to set, for a third temperature range differing from the first temperature range and second temperature range, the electric current of the light source as a function of the temperature detected by the sensor unit on a third control section of the control curve differing from the first control section and the second control section, wherein in particular the second temperature range is between the first temperature range and the third temperature range. This means the luminous flux can be generated or set across the first temperature range, the second temperature range and the third temperature range in such way that the luminous flux can comply with specifiable values, for example legally specified light values, and at the same time technical threshold values, such as a maximum temperature of the illuminated body or the lamp, across the several temperature ranges.

It can be advantageous if, with an inventive illuminated body, the control unit is designed, at least in certain ranges in the third temperature range in the event of a detected change in the temperature of the illuminated body, to change the electric current of the light source for emitting the light on the basis of the third control section of the control curve, in particular in the event of a detected temperature increase of the illuminated body, to increase the electric current of the light source for emitting the light on the basis of the third control section of the control curve and/or, in the event of a detected temperature decrease of the illuminated body, to increase the electric current of the light source for emitting the light on the basis of the third control section of the control curve. In particular, the third second temperature range is a high temperature range wherein the temperatures of the high temperature range are higher than the temperatures of the low temperature range, and wherein in particular the temperatures of the high temperature range are additionally higher than the temperatures of the medium temperature range. As an advantage, in the high temperature range in the event of a detected temperature change in the high temperature range, it is possible to prevent a threshold value, such as a maximum temperature, being exceeded or an overheating of the illuminated body in particular the light source by decreasing the electric current of the light source for emitting the light. In particular, the control curve represents in the third control section at least in certain ranges in the high temperature range a monotonously decreasing, preferentially a strictly monotonously decreasing, allocation regulation. In particular, the control curve represents in the third control section at least in certain ranges in the high temperature range a linear allocation regulation or a linear function of the temperature across the electric current or the amperage with a negative increase. Preferentially, the control curve represents in the third control section across the entire high temperature range a linear function of the temperature across the electric current or the amperage with a negative increase. This means that the third control section or the control curve can be particularly simply designed.

As an advantage with an inventive illuminated body, the sensor unit for detecting the temperature of the illuminated body can be arranged on the carrier body, preferentially on an upper side of the carrier body. This means that detection of the temperature of the illuminated body by the sensor unit can be particularly simple. Furthermore, the setting of a luminous flux of the light source of an illuminated body or the lamp can thus be performed particularly precisely across a temperature range. The arrangement of the sensor unit can also be understood as placing the sensor unit on the carrier body. In particular, the arrangement of the sensor unit, in particular of a temperature sensor of the sensor unit, is a firmly bonded or form-fit arrangement.

As a particular advantage, an inventive illuminated body can feature several light sources each for emitting light, wherein the sensor unit detects a temperature between the several lights as the temperature to be detected, in particular for setting the electric current of the light source, of the illuminated body. This makes it possible in a particularly simple and cost-effective manner to detect a temperature substitute value, in particular an average temperature, for the illuminated body. In particular, the temperature substitute value reflects, in a cost-effective manner, in particular the average temperature, essentially a temperature of the several light sources or for the several light sources. This means that the luminous flux of the several light sources of the illuminated body can be generated or set in a simple and cost-effective manner across a specifiable temperature range of the illuminated body in such a way that the luminous flux complies with specifiable light values and/or technical threshold values. In particular, the several light sources are to be understood as a plurality of light sources.

In accordance with a further preferential embodiment, an inventive illuminated body can feature several light sources each for emitting light, wherein the sensor unit detects an average temperature or essentially an average temperature of the illuminated body, preferentially an average temperature or essentially an average temperature of the several light sources. This means that the luminous flux of the several light sources of the illuminated body can be generated or set in a simple and cost-effective manner across a specifiable temperature range of the illuminated body in such a way that the luminous flux complies with specifiable light values and/or technical threshold values. In particular, prior to arranging the sensor unit, in particular a temperature sensor such as a thermistor, on the carrier body, it is possible to determine by means of thermography which light source of the several light sources comes closest to the average temperature of all light sources on the carrier body. Preferentially, in addition to the light source of the several light sources that comes closest to the average temperature of all light sources on the carrier body, the sensor unit, in particular the temperature sensor, is placed on the carrier body. This means that it is possible to take into account in a simple manner that the individual light sources of the several light sources can feature differing temperatures in operation.

According to a second aspect, the present invention shows a lamp of a vehicle, in particular a motor vehicle, wherein the lamp features at least a housing body and at least one illuminated body designed according to the invention, arranged on the housing body.

The housing is in particular for protecting and arranging the at least one illuminated body. Preferentially, the housing body protects the illuminated body from external environmental influences, such as humidity.

Furthermore, the lamp can feature several, in particular at least two, illuminated bodies designed according to the invention, wherein in particular each of the several illuminated bodies can assume a light function or several light functions. This makes it possible to implement several light functions with a lamp in a particularly simple manner.

According to the second aspect of the invention, the lamp thus features the same advantages as have already been described in relation to the illuminated body according to the first aspect of the invention.

According to a third aspect, the present invention features a method for setting an electric current at least of one light source of an illuminated body for a lamp of a vehicle, in particular for a lamp of a motor vehicle, where the illuminated body is designed according to the invention, wherein the method features as a process step detection of a temperature, in particular detection of an average temperature or of essentially an average temperature, of the illuminated body by means of the sensor unit of the illuminated body. Furthermore, the method comprises as a further process step the setting, by means of the control unit of the illuminated body as a function, of the temperature detected by the sensor unit of the illuminated body of the electric current of the light source for emitting the light for the first temperature range on the basis of the first control section of the control curve, wherein in particular an electric current is allocated to the detected temperature by means as an allocation regulation as a control curve, and/or a setting of the electric current of the light source for emitting the light for the second temperature range on the basis of the second control range of the control curve, wherein in particular an electric current is allocated to the detected temperature by means of an allocation regulation as a control curve.

In particular, detection of the temperature is performed by means of the sensor unit in at least one specifiable time interval or time step. In particular, the time interval is a time less than 1 s, preferentially a time less than 100 ms, quite preferentially a time less than 10 ms. In particular, the sensor unit communicates the detected temperature to the control unit. The communication between the sensor unit and the control unit can be wired and/or wireless. Wired communication between the sensor unit and the control unit can be particularly cost-effective. The control unit can receive the temperature detected by the sensor unit and/or the temperature, for example from a voltage value of an NTC thermistor. According to the invention, the control unit then sets, as a function of the temperature detected by the sensor unit, the electric current supplied to the light source on the basis of the control section, in particular at least on the basis of the first control section of the control curve or on the basis of the second control section of the control curve.

It can be advantageous if, with an inventive method, the control unit changes, at least in certain ranges in the first temperature range in the event of a detected change in the temperature of the illuminated body, the electric current of the light source for emitting of the light on the basis of the first control section of the control curve, in particular in the event of a detected temperature increase of the illuminated body, to increase the electric current of the light source for emitting the light on the basis of the first control section of the control curve and/or, in the event of a detected temperature decrease of the illuminated body, to increase the electric current of the light source for emitting the light on the basis of the first control section of the control curve.

As an advantage with an inventive method, the control unit can keep at least in certain ranges in the second temperature range in the event of a detected change in the temperature of the illuminated body the electric current of the light source for emitting the light on the basis of the second control section of the control curve constant or essentially constant. The expression “keep essentially constant” is intended to express that the electric current of the light source for emitting the light can, of course, fluctuate to a certain extent for technical reasons.

As a particular advantage, with an inventive method, the control unit can set or in particular change, at least in certain ranges in a third temperature range differing from the first temperature range and the second temperature range preferentially in the event of a detected change in the temperature of the illuminated body, the electric current of the light source for emitting the light on the basis of the third control section of the control curve, in particular in the event of a detected temperature increase of the illuminated body, to decrease the electric current of the light source for emitting the light on the basis of the third control section of the control curve and/or, in the event of a detected temperature decrease of the illuminated body, to increase the electric current of the light source for emitting the light on the basis of the third control section of the control curve.

In accordance with a further preferred embodiment, with an inventive method, the control unit can in the event of a detected temperature change, incrementally set the electric current of the light source for emitting the light by means of the control unit to an electric current allocated to the detected temperature. In particular, the control unit can, in the event of a detected temperature change, which in particular gives rise to a change in the current of the electric current of the light source for emitting the light, incrementally set the electric current of the light source for emitting the light by means of the control unit to an electric current allocated to the detected temperature. In other words, it is intended for there not to be a leap between two measured values, but convergence is to be implemented incrementally. By doing so, it is advantageously possible, in the event of “large” temperature changes, which can give rise to a “large” change in the current for setting the electric current of the light source, to avoid abrupt leaps in the luminous flux becoming visible. “Large” temperature changes can occur, for example, due to faulty detection of the temperature by the sensor unit, i.e. due to a measuring error, or initially, i.e. before a temperature of the illuminated body becomes known. In particular, when putting the illuminated body or the lamp into operation, the electric current of the light source is set to a rated current of the light source. The rated current of the light source is, in particular, the maximum current multiplied by the rated current factor. The incremental setting of the electric current of the light source for emitting the light from an electric current or an amperage to a current value or amperage allocated to the detected temperature is performed in particular by means of a PT1 regulation.

The method according to the third aspect of the invention, the lamp thus features the same advantages as have already been described in relation to the illuminated body according to the first aspect of the invention or the lamp according to the second aspect of the invention.

The process steps described previously and in the following can, to the extent technically useful, executed individually, combined, singly, in pluralities, temporally parallel and/or one after the other in any sequence.

Further measures refining the invention arise from the description below of various sample embodiments of the invention, which are depicted schematically in the Figures. All of the features and/or advantages arising from the claims, description or drawings, including design details, physical layout and process steps, may be vital to the invention both by themselves and in the various combinations. In this context, it should be noted that the figures are only of a descriptive character and are not intended to restrict the invention in any form.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

In the following figures, the identical reference numbers are used for the same technical features even from different sample embodiments.

Figure 1:
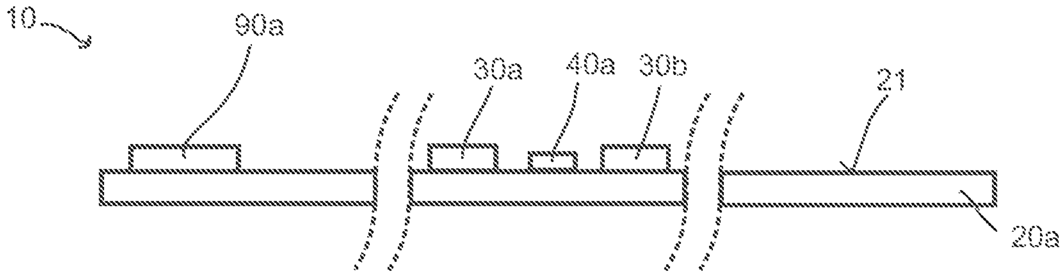
FIG. 1 is an embodiment of an inventive illuminated body.

FIG. 1 discloses schematically in a side view an embodiment of an inventive illuminated body 10. The illuminated body 10 features a carrier body 20*a* as well as light source 30*a* for emitting light arranged on the carrier body 20*a*. Furthermore, the illuminated body 10 comprises a sensor unit 40*a* for detecting a temperature of the illuminated body 10. The sensor unit 40*a* is arranged in FIG. 1 as an example on an upper side 21 of the carrier body 20*a*. In particular, the sensor unit 40*a* can be a temperature sensor, for example an NTC thermistor. The sensor unit 40*a* can also feature several temperature sensors. Furthermore, the illuminated body 10 features at least a control unit 90*a* for setting an electric current of the light source 30*a* for emitting the light of the light source 30*a* as a function of the temperature detected by the sensor unit 40*a*. The control unit 90*a* is arranged as an example on the upper side 21 of the carrier body 20*a*. The control unit 90*a* is designed to set for a first temperature range B1 (see FIG. 3 as an example) the electric current or the amperage of the light source 30*a* as a function of the temperature detected by the sensor unit 40*a* on the basis of a first control section A1 of a control curve C1 (see FIG. 3 as an example). Furthermore, the control unit 90*a* is designed to set for a second temperature range B2 differing from the first temperature range B1 (see FIG. 3 as an example) the electric current or amperage of the light source 30*a* as a function of the temperature detected by the sensor unit 40*a* on the basis of a second control section A2 differing from the first control section A1 of the control curve C1. This means that a luminous flux or light of the light source 30*a* of the illuminated body 10 of a lamp 100 can be particularly advantageously generated or set at least across the temperature range B1 and B2. Furthermore, not only specifiable luminous flux values but also technical threshold values, for example maximum temperatures of the light source 30*a*, can be complied with at the same time. As shown in FIG. 1, the illuminated body 10 can feature at least one further light source 30*b*, wherein the sensor unit 40*a* detects in particular a temperature between the several light sources 30*a* and 30*b* as the temperature of the illuminated body 10 to be detected. In particular, the sensor unit 40*a* can thus detect an average temperature or an essentially average temperature of the illuminated body 10, preferentially an average temperature or an essentially average temperature of the several light sources 30*a*, 30*b* for setting the electric current of the light sources 30*a*, 30*b*. In particular, the control unit 90*a* sets for the at least two light sources 30*a*, 30*b* in each case the electric current of the respective light source 30*a*, 30*b* as a factor of the temperature detected by the sensor unit 40*a*, to be preferentially the same or essentially the same. In particular, the light sources 30*a* and 30*b* can represent in each case a plurality of light sources. In particular, the light source 30*a* or the plurality of light sources of the light source 30*a* can form a first light group with a first light function and the light source 30*b* or the plurality of light sources of the light source 30*b* can form a further light group with a further light function.

Figure 2:
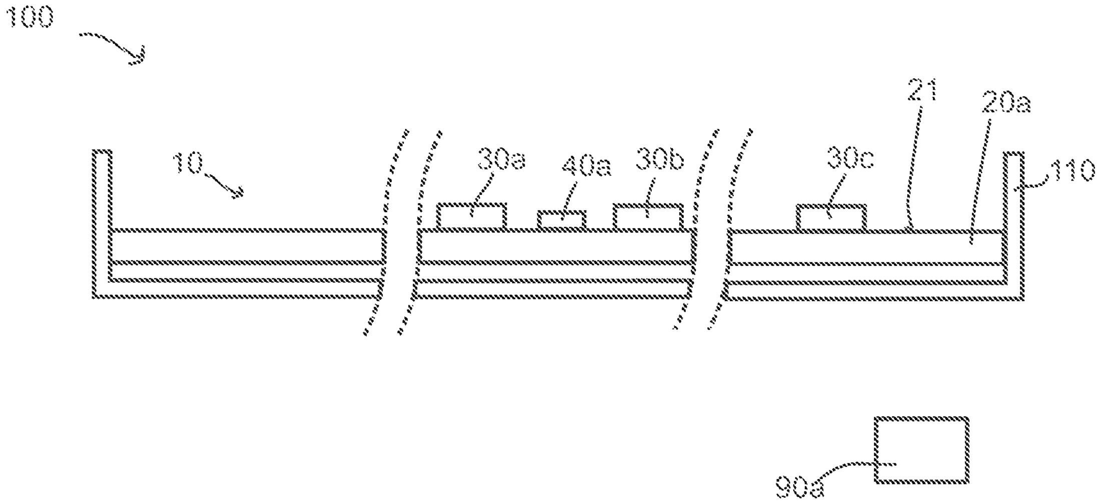
FIG. 2 is a further embodiment of an inventive illuminated body.

FIG. 2 discloses in a side view a further embodiment of an inventive illuminated body 10 and an embodiment of an inventive lamp 100 with the illuminated body 10 of the further embodiment. In comparison to the embodiment of the illuminated body 10 shown in FIG. 1, with the embodiment of the illuminated body 10 shown in FIG. 2, the control unit 90*a* is not arranged on the carrier body 20*a* of the light source 30*a* to be set. The control unit 90*a* can be, for example, a vehicle control unit or be arranged on a separately formed sub-carrier body (not shown) of the carrier body 20*a*. Furthermore, the illuminated body 10 comprises a third light source 30*c*.

Figure 3:
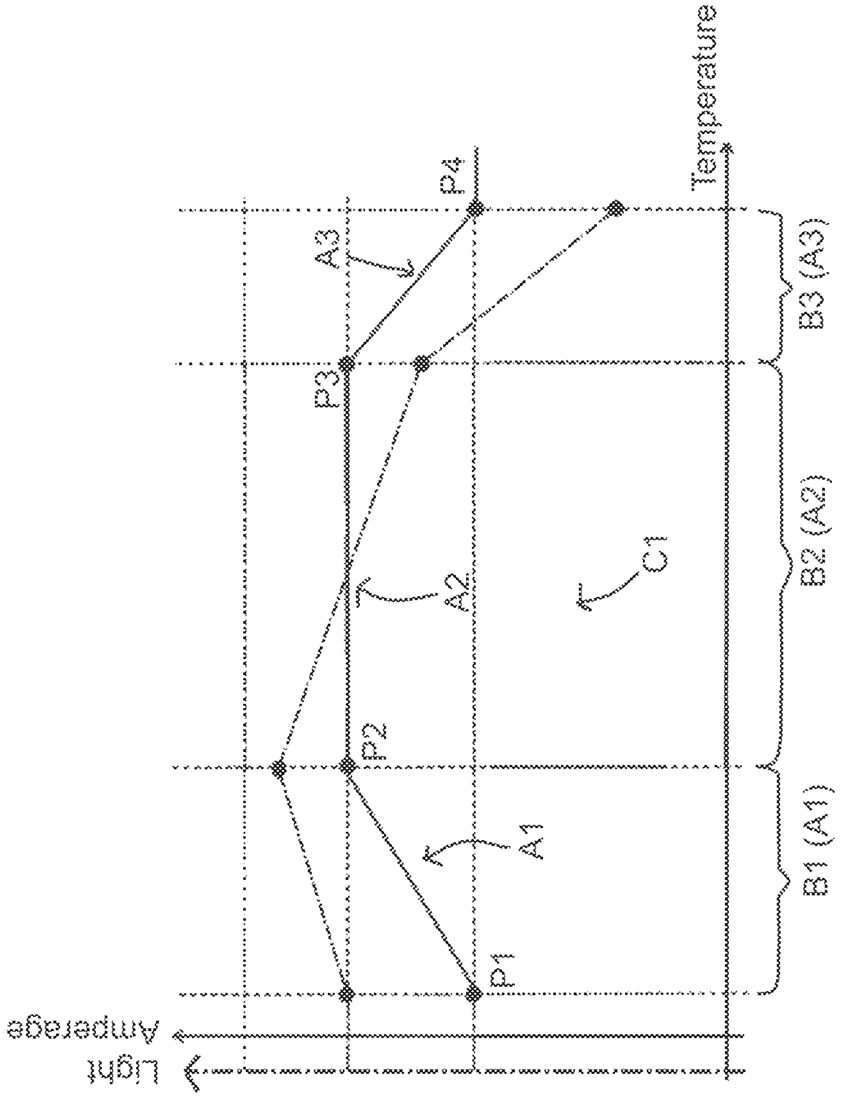
FIG. 3 illustrates the course of a light emitted from a light source.

FIG. 3 shows schematically the course of an emitted light or luminous flux (dashed and dotted line) of a light source 30*a* of an inventive illuminated body 10, as shown as an example in FIG. 1, across a temperature detected by a sensor unit 40*a* of the illuminated body 10 and the course of an electric current or amperage (solid line) across a temperature detected by the sensor unit 40*a* of the illuminated body 10. In particular, the temperature detected by the sensor unit 40*a* is an ambient temperature around the illuminated body 10, in particular an ambient temperature around the light source 30*a*. A control unit 90*a* of an inventive illuminated body 10 sets the electric current of the light source 30*a* for emitting the light of the light source 30*a* as a function of the temperature detected by the sensor unit 40*a*, 40*b*, wherein the control unit 90*a* sets for a first temperature range B1 the electric current of the light source 30*a* as a function of the temperature detected by the sensor unit 40*a* on the basis of a first control section A1 of a control curve C1 and wherein the control unit 90*a* is designed to set for a second temperature range B2 differing from the first temperature range B1 the electric current of the light source 30*a* as a function of the temperature detected by the sensor unit 40*a* on the basis of a second control section A2 of the control curve C1 differing from the first control section A1. As can be seen from FIG. 3, the first control section A1 features a first control behavior for setting the electric current of the light source 30*a* and the second control section A2 features a second control behavior differing from the first control behavior. Furthermore, the control unit 90*a* additionally sets for a third temperature range B3 the electric current of the light source 30*a* as a function of the temperature detected by the sensor unit 40*a* on the basis of a third control section A3 of a control curve C1. In particular, in this example the three control sections A1, A2 and A3 feature control behaviors differing from each other. The first temperature range B1, the second temperature range B2 and the third temperature range B2 form in particular a coherent temperature range. The first temperature range B1 is in particular a low temperature range. The second temperature range B2 is in particular a medium temperature range. The third temperature range B3 is in particular a high temperature range. Furthermore, the control curve C1 represents an allocation regulation. In particular (allocation) values for the allocation regulation can be stored in the control unit 90*a*. A temperature-electric current (value) pair can be understood to be a value or allocation value of an allocation regulation. A temperature-electric current pair can also be understood to be a supporting point. FIG. 3 shows the supporting points P1, P2, P3 and P4. Values between two in each case of the four supporting points P1, P2, P3 and P4, i.e. between P1-P2 and P2-P3 as well as P3-P4 are interpolated in particular by means of the control unit 90*a* for setting the electric current of the light source 30*a*. As an example, the control curve C1 constitutes in the first control section a linear function with a positive increase. As an example, the control curve C1 furthermore constitutes in the second control section a linear function with a zero increase. Furthermore, the control curve C1 in the third control section constitutes, as an example, a linear function with a negative increase. Furthermore in FIG. 3, the first control section A1, the second control section A2 and the third control section A3 together form a continuous curve, in particular a continuously control curve C1. In particular, the continuous control curve features a kink point at a temperature transition from the first temperature range B1 to the second temperature range B2. Furthermore, the control curve C1 features a kink point at a temperature transition from the second temperature range B2 to the third temperature range B3. In particular, FIG. 3 shows three ranges of the regulation:

Range 1 (low temperature range): Increase from minimum current to rated current and/or wherein in particular within the operating temperature range and the light values are legal and/or wherein in particular exceeding of the legal light values at low (LED) temperatures is prevented by adjusting the electric (LED) current, and/or wherein in particular the light color is within the legal limits, Range 2 (medium temperature range): Rated current remains constant and/or wherein in particular within the operating temperature range and the light values are legal, and/or wherein in particular the change in the light values are not compensated through the electric (LED) current, and/or wherein in particular a natural degradation of the (LED) light sources occurs, and/or wherein in particular the light color is within the legal limits, Range 3 (high temperature range): Decrease from rated current to minimum current and/or wherein in particular outside the operating temperature range and light values may no longer be legal, and/or wherein overheating of the LEDs or the system is prevented by adjusting the electric (LED) current, and/or wherein in particular the light color is outside the legal limits.

Figure 4:
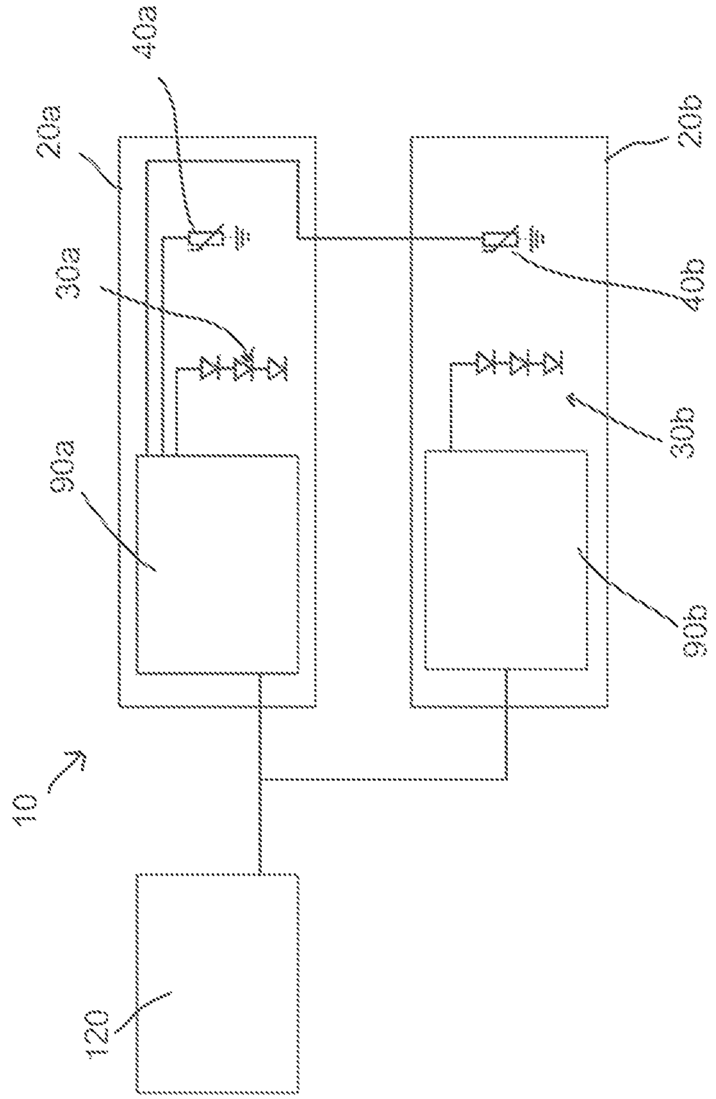
FIG. 4 is a further embodiment of an inventive illuminated body.

FIG. 4 discloses schematically a further embodiment of an inventive illuminated body 10. Here, the illuminated body 10 features a multi-piece carrier body with two sub-carrier bodies 20*a* and 20*b*. Furthermore, the control unit comprises the sub-control units 120. 90*a* and 90*b*. The sub-control unit 120 is in particular a vehicle control unit. The sub-control unit 90*a* and a light source 30*a* are arranged on the sub-carrier body of the carrier body. The sub-control unit 90*b* and a light source 30*b* are arranged on the sub-carrier body 20*b* of the carrier body. The light sources 30*a* and 30*b* are in particular each a plurality of light-emitting diode. Furthermore, a sensor unit 40*a* or, as the case may be, 40*b* is arranged on each of the two sub-carrier bodies 20*a*, 20*b*. In particular, the two sensor units 40*a*, 40*b* are each a temperature sensor, preferentially in each case a NTC thermistor. Furthermore, the two sub-control units 90*a*, 90*b* can in particular each be designed as an LED driver. The sub-control unit 120 is in particular an ECU. As an advantage, the three sub-control units 90*a*, 90*b* and 120 are in each case connected to each other for communication technology purposes. Communication between the three sub-control units 90*a*, 90*b* and 120 is preferentially a bidirectional communication. In particular, the sub-control unit 90*a* does not directly evaluate the temperature values detected by the temperature sensor 40*a*, in particular NTC values, and/or the temperature values detected by the temperature sensor 40*b*, in particular NTC values. Preferentially, the temperature values detected by the temperature sensor or temperature sensor 40*b*, in particular NTC values, are transmitted to the sub-control unit 120, preferentially transmitted to the sub-control unit 120 in a polling operation. Preferentially, the logical unit of the sub-control unit 120 collects further all temperature values, in particular NTC values and subsequently communicates the values back to the corresponding sub-control units 90*a* or 90, in particular to the corresponding LED drivers. Advantageously, this gives rise for example to the option of also reading out NTCs from other LED drivers and to average several NTCs. As an example, in FIG. 4 the LED driver is fully allocated as a sub-control unit 90*b* such that the NTC value is read out from the LED driver as a sub-control unit 90*a*. In particular, for each LED there is the option to regulate two light groups, in particular temperature groups, in order, for example, to operate two different light functions with one driver. Allocation is assumed in particular by the NTC, allocation to the groups is assumed in particular by the ECU. Preferentially, an invalid temperature is initially transmitted to actuate the LEDs. This makes it possible in particular to start the system without derating as the temperature is unknown at the beginning. Furthermore, the current values relating to the LED are preferentially continuously transmitted back during the first communication and the transmission back of the NTC values.

Figure 5:
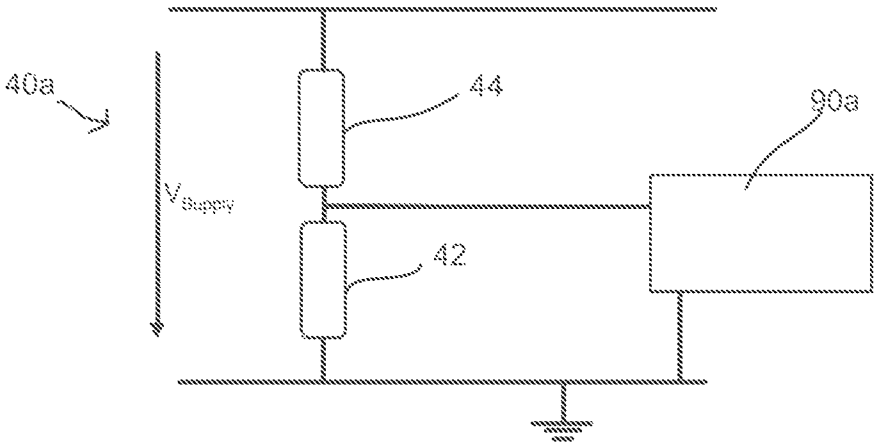
FIG. 5 is an embodiment of an inventive sensor unit.

FIG. 5 discloses schematically an embodiment of an inventive sensor unit 40*a*, in particular an inventive temperature sensor, of an inventive illuminated body 10 (see for example FIG. 1) for detecting a temperature of the illuminated body 10. The sensor unit 40*a* comprises at least one ohmic resistance 44 and an NTC thermistor 42. The ohmic resistance 44 and the NTC thermistor are wired in series. Furthermore, a voltage $V_{Supply}$ is present in the series circuit of the ohmic resistance 44 and the NTC thermistor 42. The NTC thermistor 42 is in particular connected for communication technology purposes to a control unit 90*a*, preferentially with an LED channel of an LED driver as control unit 90*a*. Preferentially, the NTC thermistor 42 can transmit to the control unit 90 a voltage value, as a function of the temperature, that corresponds to a temperature value. With such a sensor unit 40*a*, it is possible to detect a temperature of the illuminated body 10 in a particularly simple and cost-effective manner.

Figure 6:
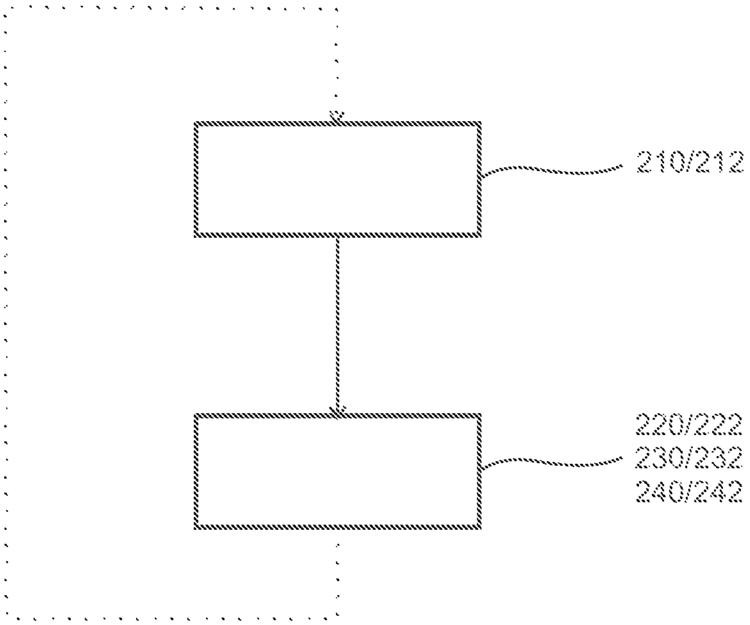
FIG. 6 is an embodiment of an inventive method.

FIG. 6 discloses an embodiment of an inventive method for setting an electric current at least of one light source 30*a* of an inventive illuminated body 10 for a lamp 100 of a vehicle, in particular for a lamp 100 of a motor vehicle. The method comprises as one step detection 210 of a temperature of the illuminated body 10, in particular detection 212 of an average temperature, by means of the sensor unit 40*a* of the illuminated body 10. Detection 210 of the temperature of the illuminated body is followed in the inventive method setting 220, in particular changing 222, of the electric current of the light source 30*a* for emitting the light for the first temperature range B1 on the basis of the first control section A1 of the control curve C1 and/or setting 230 in particular keeping constant or essentially keeping constant 232 of the electric current of the light source 30*a* for emitting the light for the second temperature range B2 on the basis of the second control section A2 of the control curve C1 differing from the first control section A1 and/or additionally setting 240, in particular changing 242, of the electric current of the light source 30*a* for emitting the light for a third temperature range B3 on the basis of the third control section A3 of the control curve C1 differing from the first control section A1 and from the second control section. Setting 220, in particular changing 222, the electric current of the light source 30*a* for emitting the light for the first temperature range B1 on the basis of the first control section A1 and/or setting 230, in particular keeping constant or essentially keeping constant 232, of the electric current of the light source 30*a* for emitting the light for the second temperature range B2 on the basis of the second control section A2 of the control curve C1 and/or setting 240, in particular changing 242, the electric current of the light source 30*a* for emitting the light for the third temperature range B3 on the basis of the third control section A3 of the control curve C1 is performed by means of the control unit 90*a* as a function of the temperature detected by the sensor unit 40*a*. In particular, the temperature of the illuminated body 10 is continuously monitored by means of the sensor unit 40*a* during operation of the illuminated body 10.

LIST OF REFERENCE NUMBERS

10 Illuminated body
20*b* Carrier body
21 Upper side
30*b*, 30*c* Light source
40*b* Sensor unit
42 NTC thermistor
44 Ohmic resistance
90*b* Control unit
100 Lamp
110 Housing body
120 Vehicle control unit
A1 First control section
A2 Second control section
A3 Third control section
B1 First temperature range
B2 Second temperature range
B3 Third temperature range
C1 Control curve
P1 First supporting point
P2 Second supporting point
P3 Third supporting point
P4 Fourth supporting point
210 Detection of a temperature
212 Detection of an average temperature
220 Setting of electric current for first temperature range
222 Changing electric current for first temperature range
230 Setting electric current for second temperature range
232 Keeping electric current constant for second temperature range
240 Setting electric current for third temperature range
242 Changing electric current for third temperature range
$V_{supply}$ Supply voltage

The invention claimed is:

1. An illuminated body for a lamp of a vehicle, the illuminated body comprising:

at least one carrier body;

at least one light source arranged on the at least one carrier body for emitting light;

at least one sensor unit for detecting a temperature of the at least one light source; and at least one control unit for setting an electric current of the at least one light source for emitting the light of the at least one light source as a function of the temperature detected by the at least one sensor unit, wherein the at least one control unit sets, for a first temperature range (B1), the electric current of the at least one light source as a function of the temperature detected by the at least one sensor unit on the basis of a first control section (A1) of a control curve (C1), wherein the at least one control unit sets, for a second temperature range (B2) differing from the first temperature range (B1), the electric current of the at least one light source as a function of the temperature detected by the at least one sensor unit on the basis of a second control section (A2) of the control curve (C1) differing from the first control section (A1), wherein the at least one light source comprises multiple light sources for emitting the light, wherein the at least one sensor unit is configured to detect an average temperature or essentially an average temperature of the light sources, wherein the at least one control unit is configured to determine a light source of the light sources having a closest temperature to the average temperature, and wherein the at least one control unit is configured to set the electric current of the light sources as a function of the temperature of the light source having the closest temperature to the average temperature.

2. The illuminated body in accordance with claim 1, wherein the first control section (A1) of the control curve (C1) includes a first control behavior for setting the electric current of the light sources and the second control section (A2) of the control curve (C1) includes a second control behavior differing from the first control behavior.

3. The illuminated body in accordance with claim 1, wherein the control curve (C1) represents an allocation regulation to allocate, to the average temperature of the light sources detected by the at least one sensor unit, an electric current for setting the electric current of the light sources for emitting the light of the light sources.

4. The illuminated body in accordance with claim 1, wherein the at least one control unit, at least in certain ranges in the first temperature range (B1) in the event of a detected change in the average temperature of the light sources, changes the electric current of the light sources for emitting the light on the basis of the first control section (A1) of the control curve (C1).

5. The illuminated body in accordance with claim 4, wherein in the event of a detected average temperature increase of the light sources, the at least one control unit increases the electric current of the light sources for emitting the light on the basis of the first control section (A1) of the control curve (C1) and/or, in the event of a detected average temperature decrease of the light sources, the at least one control unit decreases the electric current of the light sources for emitting the light on the basis of the first control section (A1) of the control curve (C1).

6. The illuminated body in accordance with claim 1, wherein the at least one control unit maintains, at least in certain ranges in the second temperature range (B2) in the event of a detected change in the average temperature of the light sources, the electric current of the light sources for emitting the light on the basis of the second control section (A2) of the control curve (C1) constant or essentially constant.

7. The illuminated body in accordance with claim 1, wherein the at least one control unit sets, for a third temperature range (B3) differing from the first temperature range (B1) and the second temperature range (B2), the electric current of the light sources as a function of the average temperature of the light sources detected by the at least one sensor unit on a third control section (A3) of the control curve (C1) differing from the second control section (A2) and the first control section (A1).

8. The illuminated body (10) in accordance with claim 7, wherein the at least one control unit, at least in certain ranges in the third temperature range (B3) in the event of a detected change in the average temperature of the light sources, changes the electric current of the light sources for emitting the light on the basis of the third control section (A3) of the control curve (C1), wherein in the event of a detected average temperature increase of the light sources, the at least one control unit decreases the electric current of the light sources for emitting the light on the basis of the third control section (A3) of the control curve (C1) and/or, in the event of a detected average temperature decrease of the light sources, the at least one control unit increases the electric current of the light sources for emitting the light on the basis of the first control section (A3) of the control curve (C1).

9. The illuminated body in accordance with claim 7, wherein the second temperature range (B2) is between the first temperature range (B1) and the third temperature range (B3).

10. The illuminated body in accordance with claim 1, wherein the at least one sensor unit for detecting the average temperature of the light sources is arranged on the at least one carrier body.

11. A lamp of a vehicle, wherein the lamp comprises:

a housing body, and at least one illuminated body in accordance with claim 1 arranged on the housing body.

12. The illuminated body in accordance with claim 1, wherein the at least one control unit is configured to determine the light source having the closest temperature to the average temperature via thermography.

13. A method for setting an electric current of multiple light sources of an illuminated body for a lamp of a vehicle, wherein the illuminated body is in accordance with claim 1, the method comprising:

detecting an average temperature of the light sources by the at least one sensor unit of the illuminated body;

receiving, by the at least one control unit of the illuminated body, the detected average temperature from the at least one sensor unit of the illuminated body (10);

determining, by the at least one control unit, a light source of the light sources having a closest temperature to the average temperature; and at least one of:

setting the electric current of the light sources for emitting the light for the first temperature range (B1) on the basis of the first control section (A1) of the control curve (C1), wherein an electric current is allocated to the detected average temperature by an allocation regulation as a control curve (C1), and/or setting of the electric current of the light sources for emitting the light for the second temperature range (B2) on the basis of the second control section (A2) of the control curve (C1) differing from the first control section (A1), wherein an electric current is allocated to the detected average temperature by means of an allocation regulation as a control curve (C1);

wherein the at least one control unit sets the electric current of the light sources as a function of the temperature of the light source having the closest temperature to the average temperature.

14. The method in accordance with claim 13, wherein the at least one control unit, at least in certain ranges in the second temperature range (B1) in the event of a detected change in the average temperature of the light sources, changes the electric current of the light sources for emitting the light on the basis of the first control section (A1) of the control curve (C1), and wherein the at least one control unit, in the event of a detected average temperature increase of the light sources, increases the electric current of the light sources for emitting the light on the basis of the first control section (A1) of the control curve (C1) and/or, in the event of a detected average temperature decrease of the light sources, decreases the electric current of the light sources for emitting the light on the basis of the first control section (A1) of the control curve (C1).

15. The method in accordance with claim 13, wherein the at least one control unit, at least in certain ranges in the second temperature range (B2) in the event of a detected change in the average temperature of the light sources, maintains the electric current of the light sources for emitting the light on the basis of the second control section (A2) of the control curve (C1) constant or essentially constant.

16. The method in accordance with claim 13, wherein the at least one control unit, at least in certain ranges in a third temperature range (B3) differing from the first temperature range (B1) and the second temperature range (B2) in the event of a detected change in the average temperature of the light sources, changes the electric current of the light sources for emitting the light on the basis of a third control section (A3) of the control curve (C1), wherein in the event of a detected average temperature increase of the light sources, decreases the electric current of the light sources for emitting the light on the basis of the third control section (A3) of the control curve (C1) and/or, in the event of a detected average temperature decrease of the light sources, increases the electric current of the light sources for emitting the light on the basis of the third control section (A3) of the control curve (C1).

17. The method in accordance with claim 13, wherein the at least one control unit, in the event of a detected change in the average temperature of the light sources, incrementally sets the electric current of the light sources for emitting the light by the at least one control unit to an electric current allocated to the detected average temperature.

18. The method in accordance with claim 13, wherein the at least one control unit determines the light source having the closest temperature to the average temperature via thermography.

* * * * *